US006546017B1

United States Patent
Khaunte

(12) United States Patent
(10) Patent No.: US 6,546,017 B1
(45) Date of Patent: Apr. 8, 2003

(54) TECHNIQUE FOR SUPPORTING TIERS OF TRAFFIC PRIORITY LEVELS IN A PACKET-SWITCHED NETWORK

(75) Inventor: Sunil Khaunte, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/263,147

(22) Filed: Mar. 5, 1999

(51) Int. Cl.[7] ............................................. H04L 12/28
(52) U.S. Cl. ...................................... 370/412; 370/468
(58) Field of Search .......................... 375/222; 370/282, 370/351, 389, 395.1, 395.2, 395.21, 395.4, 395.41, 395.42, 395.43, 395.52, 442, 458, 463, 468, 469, 480, 412–418

(56) References Cited

U.S. PATENT DOCUMENTS

| | | | | |
|---|---|---|---|---|
| 5,917,822 A | * | 6/1999 | Lyles et al. | 370/395.4 |
| 6,216,171 B1 | * | 4/2001 | Isono et al. | 370/463 |
| 6,223,222 B1 | * | 4/2001 | Fijolek et al. | 370/236 |
| 6,304,578 B1 | * | 10/2001 | Fluss | 370/235 |
| 6,351,773 B1 | * | 2/2002 | Fijolek et al. | 709/222 |

OTHER PUBLICATIONS

S.Blake, An Architecture For Differentiated Services, pp. 1–30, 1998.*

* cited by examiner

Primary Examiner—David Vincent
(74) Attorney, Agent, or Firm—Beyer Weaver & Thomas, LLP

(57) ABSTRACT

The technique of the present invention provides a simple and efficient solution to the problem of supporting differentiated priority levels within a QoS service class within a packet-switched network. When a bandwidth request is received at the cable modem head end, the service ID of that particular cable modem is identified. From this service ID, the associated static priority value of the requesting modem's service class is determined. The grant scheduler at the CMTS maintains a single queuing structure to temporarily store all differentiated priority bandwidth requests associated with a particular class of service that are received from cable modems on a selected channel. The technique of the present invention implements a procedure to calculate a metric used in determining a queuing priority for each received bandwidth request so that a single priority queuing structure may be used for this purpose. The metric is calculated by subtracting a product of the static priority value from the arrival time value of an associated bandwidth request. Use of the static service class priority in the queuing priority metric helps the grant scheduler to prioritize bandwidth requests from high priority modems over requests from low priority modems in the same queuing structure. Use of the arrival time in the metric enables an implicit fairness feature in the traffic prioritization to prevent starvation of low priority traffic.

38 Claims, 10 Drawing Sheets

Upstream Channel[i] to CMTS

Initial Ranging Subchannel

Bandwidth-Request Subchannel

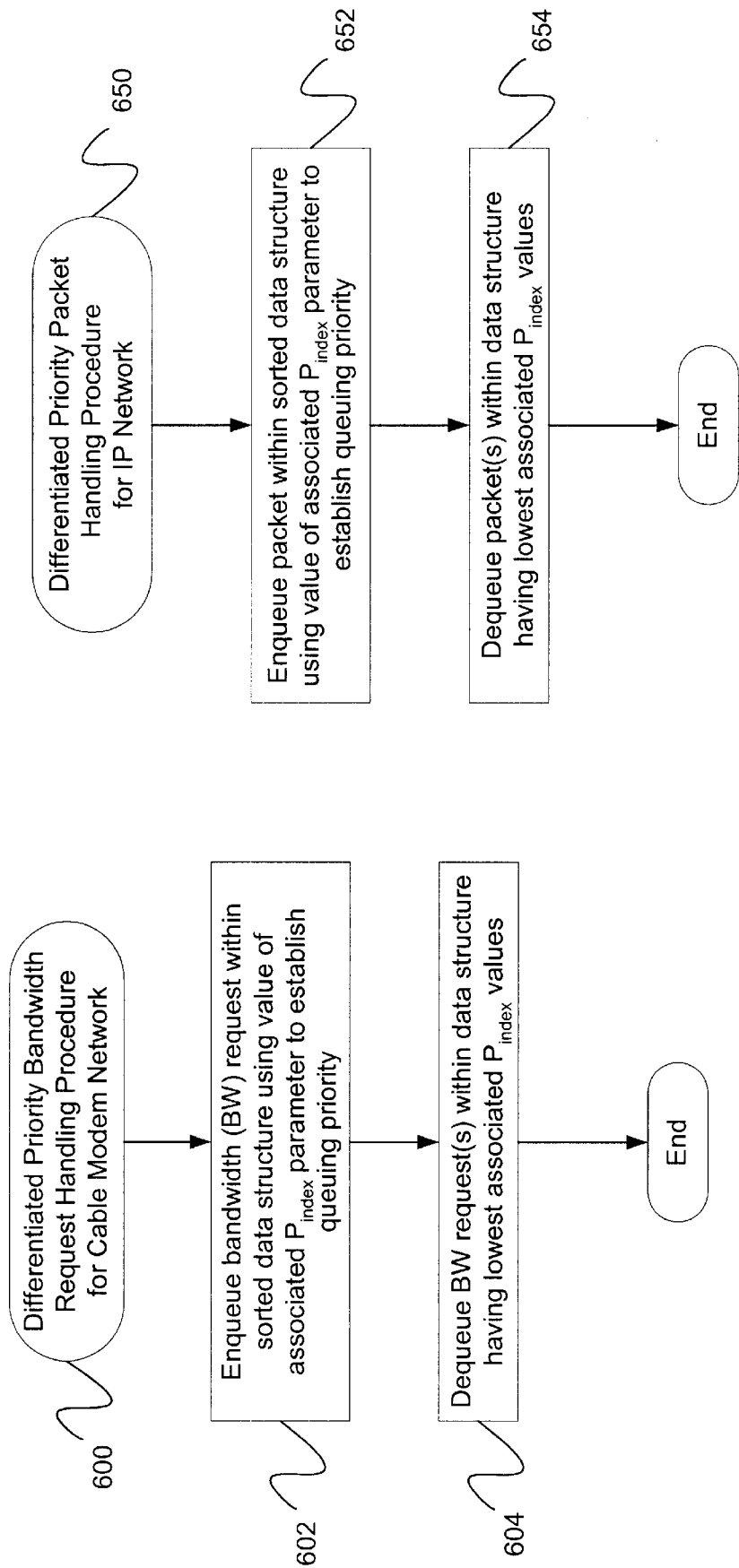

| Bandwidth Request/Packet | Priority | Arrival Time (mS) | $P_{index}$ |
|---|---|---|---|
| A | P7 | 100 | 30 |
| B | P7 | 110 | 40 |
| C | P6 | 110 | 50 |
| D | P7 | 115 | 45 |
| E | P7 | 120 | 50 |
| F | P0 | 120 | 120 |
| G | P7 | 120 | 50 |
| H | P7 | 130 | 60 |
| I | P7 | 170 | 100 |
| J | P7 | 200 | 130 |
| K | P7 | 210 | 140 |

PRIORITY_WEIGHT = 10

TECHNIQUE FOR SUPPORTING TIERS OF TRAFFIC PRIORITY LEVELS IN A PACKET-SWITCHED NETWORK

BACKGROUND OF THE INVENTION

1. Field Of Invention

The present invention relates generally to methods and apparatus for transmitting digital data in packet-switched networks. More specifically, the present invention relates to methods and apparatus for supporting tiers of traffic priority levels in a packet-switched network.

2. Background

Today's integrated service networks are able to support a plurality of different service classes, which may include a bandwidth-guaranteed service class and a best-effort service class. Further, protocols that enable high-speed data access over these integrated service networks, such as cable networks or linked networks (e.g. LANs, WANs, Internet, etc.) have recently been configured to support differentiated Quality of Service (QoS) within selected service classes.

When a scheduler or router has outstanding requests from plurality of different subscribers, it should be able to differentiate and offer better service to selected subscribers (who have subscribed for a higher grade of service) as compared to other subscribers (who have subscribed for lower grade of service). As a result, service providers are now offering differentiated service, particularly within the best-effort service class (herein referred to as "tiered best-effort"), whereby different grades or priority levels of service within the best effort class are offered to the subscriber, each with a different pricing plan.

For example, a conventional tiered best-effort service may provide eight differentiated priority levels of best-effort service, each with a different pricing plan. Thus, a subscriber may choose to pay more money for a relatively higher priority best-effort service, whereby, presumably, packets having a relatively higher priority of best-effort service will be routed faster than packets with relatively lower priority best-effort service.

Companies which implement tiered best-effort service typically implement some type of grant prioritization scheme for handling the tiered best-effort traffic. Conventional traffic prioritization algorithms use separate FIFO queues for queuing bandwidth requests (in cable modem networks) or packets (in packet-switched networks) related to a particular priority level of service. A strict priority server is typically used to service the FIFO queues in order of their priority. Thus, for example, in a tiered best-effort service class having eight distinct levels of priority (0–7), 8 separate FIFO queues will typically be provided for servicing bandwidth requests or packets related to each distinct priority level. This can be seen, for example, in FIG. 8 of the drawings.

FIG. 8A shows an example of a plurality of bandwidth request/packets or packets being received at a cable network head end or router. The requests/packets of FIG. 8A are all within the tiered best-effort service class, which in this example includes eight levels of priority (level 7–level 0). Each request/packet has an associated priority level (P) and arrival time (T). FIG. 8B shows a plurality of FIFO queues 810 which are used for queuing the received request/packets of FIG. 8A until each request/packet is able to be processed. As shown in FIG. 8B, each priority level within the tiered best-effort service class has its own respective FIFO queue. Queue 802 corresponds to priority level 7, queue 804 corresponds to priority level 6, and queue 806 corresponds to priority level 0 within the tiered best-effort service class.

A number of conventional scheduling techniques may be employed to service the queued request/packets within queue array 810. One common technique used to service bandwidth requests and/or packets is the use of a strict priority server. The following example provides a brief illustration of how tiered best-effort service is conventionally implemented in a cable modem networks using a strict priority service algorithm.

The process starts with a bandwidth request being sent on the upstream channel by a cable modem at the subscriber end. When the bandwidth request is received at the cable head end, the service ID (SID) of the cable modem is identified, and from this service ID the particular class of service (i.e. static priority level) associated with the requesting modem's service class is determined. The received bandwidth request is then enqueued in the appropriate FIFO queue within the queue array 810 corresponding to it's associated level of priority. Thus, for example, bandwidth request A (FIG. 8A) is associated with priority 7, and therefore enqueued in queue 802 of FIG. 8B. The remainder of the bandwidth requests B-K of FIG. 8A are similarly queued within queue array 810, according to each request's associated priority level.

A static priority server is used to service the queued bandwidth requests of FIG. 8B. According to the static priority service algorithm, FIFO queues associated with the highest priority level(s) are serviced completely before serving FIFO queues associated with lower priority levels. In the example of FIG. 8, the queued bandwidth requests in FIFO queue 802 would be serviced first (until the queue is empty), followed by queue 804, and eventually queue 806.

One common problem associated with conventional prioritization techniques such as the above-described strict priority scheduling technique, is the requirement of maintaining a separate FIFO queue for each respective priority level within a particular service class for each individual upstream channel [i]. This requirement not only increases complexity and overhead of the network, but also decreases resource utilization since a predetermined amount of memory is typically reserved and allocated for implementing each queue within structure 810, meaning that this allocated memory is unavailable for use for other purposes. Another drawback to the above-described technique is that it is not easily scalable to accommodate changes in the number of static priority levels within a particular service class. In other words, an additional and separate queue must be implemented for each new priority level included within a particular service class. Furthermore, the software for the scheduling algorithm must also be modified to accommodate servicing of the additional priority queues.

Another problem of the above-described technique relates to starvation of low priority traffic. For example, in serving the bandwidth requests of FIG. 8B in the manner described above, it is possible to get a continuous supply of bandwidth requests in the higher priority FIFO queues, which results in starvation of the bandwidth requests queued in the lower priority FIFO queues. To address this problem, it is often necessary to implement a weighted round robin servicing algorithm which uses a fairness algorithm in serving the FIFO queues to ensure that the low priority FIFO queues are sufficiently service so as not to be starved by a continues supply of bandwidth requests in the higher priority FIFO queues.

The round robin scheduling technique is commonly known to those skilled in the art and is described, for example, in the publication "Round-Robin Space Scheduling for Max-Min Fairness in Data Networks," by Ellen L. Hahne, IEEE Journal on Selected Areas in Communications, Volume 9, pages 1024–1036, September 1991, herein incorporated by reference in its entirety for all purposes.

In the weighted Round Robin server implementation, each FIFO queue is pre-assigned a weight, which for example, may be expressed in terms of a number of rounds (e.g. bandwidth requests) to be dequeued from a particular queue during a given cycle, or expressed in terms of a number of bytes to be processed from that queue during a given cycle. By assigning higher weights to the higher priority FIFO queues, a greater number of packets will be processed from these queues, thereby achieving prioritization. At the same time, assigning a small weight to the lower priority queues ensures that at least a minimum number of rounds will be processed from these queues during a given cycle. In this way, starvation of lower priority traffic is avoided.

However, the use of a weighted Round Robin server to service the FIFO queues introduces complexity into the priority service as compared to the conventional strict priority server technique. Moreover, above-described problems are common to both grant schedulers in cable modem head ends and packet schedulers in packet-switched networks.

It is desirable, therefore, to provide a technique for servicing traffic corresponding to a plurality of differentiated levels within a particular service class which is easily scalable and which can support any number of service levels (i.e, static service class priorities) without incurring overhead of maintaining separate FIFO queues for each priority level. Additionally, it is desirable to provide a technique for serving traffic corresponding to a plurality of differentiated levels within a particular service class which does not rely on a separate priority server or round robin scheduling algorithm with an explicit fairness algorithm to avoid starvation of low priority traffic.

SUMMARY OF THE INVENTION

According to specific embodiments of the invention, a technique is provided for servicing traffic in a packet-switched, integrated services network which supports a plurality of different service classes. The technique of the present invention uses a single data structure for implementing differentiated levels of service priority within a particular service class. The technique is easily scalable and can support any number of different priority levels without incurring overhead of maintaining separate FIFO queues for each priority level within a particular service class. Additionally, the technique of the present invention does not require the use of an explicit queue server (e.g. strict priority or weighted round robin) or explicit fairness algorithm to avoid starvation of low priority traffic.

According to a specific embodiment of the present invention, a method is provided for handling traffic in a packet-switched integrated services network which supports a plurality of different service classes. The method comprises the steps of receiving at a first arrival time ($T_1$), a first bandwidth request, the first bandwidth request being associated with a particular priority class of service ($P_{CM1}$); and receiving at a second arrival time ($T_2$), a second bandwidth request, the second bandwidth being associated with a different priority class of service ($P_{CM2}$) The method further includes the block of calculating a respective priority index value for each received bandwidth request, wherein the priority index value is a function of the arrival time and priority class of each respective bandwidth request. The first and second bandwidth requests are then enqueued within a common queuing structure in an order based upon their respective priority index values. Bandwidth requests queued within the queuing structure are serviced in an order based upon their respective priority index values. An additional aspect of this embodiment includes the block of calculating each respective priority index value by subtracting a product of the priority class of service value from the arrival time value associated with each respective bandwidth request.

A second specific embodiment of the present invention provides a method for handling traffic in a packet-switched integrated services network which supports a plurality of different service classes. The method includes the steps of receiving a bandwidth request at an arrival time (T), the bandwidth request being associated with one of a plurality of different priority classes of service, the one priority class ($P_{CM}$) having a numeric value associated therewith; and assigning a respective priority index value to the received bandwidth request, wherein the priority index value is calculated by subtracting a product of the $P_{CM}$ value from the T value. The received bandwidth request is then enqueued within a sorted queuing structure in an order based upon its priority index value. An additional aspect of this embodiment includes the block of calculating the priority index value ($P_{index}$) according to: $P_{index}=T-(P_{CM}*PRIORITY\_WEIGHT)$, wherein the PRIORITY_WEIGHT value is a predetermined constant.

A third aspect of the present invention is directed to a method for handling traffic in a packet-switched integrated services network which supports a plurality of different service classes. The method comprises the steps of receiving at a first arrival time ($T_1$), a first packet, the first packet being associated with a particular priority class of service ($P_{CM1}$); and receiving at a second arrival time ($T_2$), a second packet, the second bandwidth being associated with a different priority class of service ($P_{CM2}$). The method further includes the block of calculating a respective priority index value for each received packet, wherein the priority index value is a function of the arrival time and priority class of each respective packet. The first and second packets are then enqueued within a common queuing structure in an order based upon their respective priority index values. Packets queued within the queuing structure are serviced in an order based upon their respective priority index values. An additional aspect of this embodiment includes the block of calculating each respective priority index value by subtracting a product of the priority class of service value from the arrival time value associated with each respective packet.

A fourth specific embodiment of the present invention is directed to a method for handling traffic in a packet-switched integrated services network which supports a plurality of different service classes. The method includes the steps of receiving a packet at an arrival time (T), the packet being associated with one of a plurality of different priority classes of service, the one priority class ($P_{CM}$) having a numeric value associated therewith; and assigning a respective priority index value to the received packet, wherein the priority index value is calculated by subtracting a product of the $P_{CM}$ value from the T value. The received packet is then enqueued within a sorted queuing structure in an order based upon its priority index value. An additional aspect of this embodiment includes the block of calculating the priority index value ($P_{index}$) according to: $P_{index}=T-(P_{CM}*PRIORITY\_WEIGHT)$, wherein the PRIORITY_WEIGHT value is a predetermined constant.

A fifth specific embodiment of the present invention provides a computer program product for handling traffic in a packet-switched integrated services network which supports a plurality of different service classes. The computer program product includes at least one computer useable medium having computer readable code embodied therein. The computer readable code comprises computer code for determining an arrival time (T) and a service class priority ($P_{CM}$) associated with a received bandwidth request; computer code for assigning a respective priority index value ($P_{index}$) to the received bandwidth request, wherein the priority index value is calculated by subtracting a product of the $P_{CM}$ value from the T value; and computer code for enqueuing the received bandwidth request within a sorted queuing structure in an order based upon its $P_{index}$ value. An additional aspect of this embodiment includes computer code for calculating the priority index value ($P_{index}$) according to: $P_{index}=T-(P_{CM}*PRIORITY\_WEIGHT)$, wherein the PRIORITY_WEIGHT value is a predetermined constant.

A sixth specific embodiment of the present invention provides a computer program product for handling traffic in a packet-switched integrated services network which supports a plurality of different service classes. The computer program product includes at least one computer useable medium having computer readable code embodied therein. The computer readable code comprises computer code for determining an arrival time (T) and a service class priority ($P_{CM}$) associated with a received packet; computer code for assigning a respective priority index value ($P_{index}$) to the received packet, wherein the priority index value is calculated by subtracting a product of the $P_{CM}$ value from the T value; and computer code for enqueuing the received packet within a sorted queuing structure in an order based upon its $P_{index}$ value. An additional aspect of this embodiment includes computer code for calculating the priority index value ($P_{index}$) according to: $P_{index}=T-(P_{CM}*PRIORITY\_WEIGHT)$, wherein the PRIORITY_WEIGHT value is a predetermined constant.

A seventh specific embodiment of the present invention provides a router for handling traffic in a packet-switched, integrated services network which supports a plurality of different service classes. The router includes means for determining an arrival time (T) and a service class priority value ($P_p$) associated with a received packet; means for assigning a respective priority index value ($P_{index}$) to the received packet, wherein the priority index value is calculated by subtracting a product of the $P_{CM}$ value from the T value; and means for enqueuing the received packet within a sorted queue in an order based upon the $P_{index}$ value. An additional aspect of this embodiment includes means for calculating the priority index value according to: $P_{index}=T-(P_p*PRIORITY\_WEIGHT)$, wherein the PRIORITY_WEIGHT value is a predetermined constant.

An eighth specific embodiment of the present invention provides a cable router for handling traffic in a packet-switched, integrated services network which supports a plurality of different service classes. The router includes means for determining an arrival time (T) and a service class priority value ($P_{CM}$) associated with a received bandwidth request; means for assigning a respective priority index value ($P_{index}$) to the received bandwidth request, wherein the priority index value is calculated by subtracting a product of the $P_{CM}$ value from the T value; and means for enqueuing the received bandwidth request within a sorted queue in an order based upon the $P_{index}$ value. An additional aspect of this embodiment includes means for calculating the priority index value according to: $P_{index}=T-(P_{CM}*PRIORITY\_WEIGHT)$, wherein the PRIORITY_WEIGHT value is a predetermined constant.

A ninth specific embodiment of the present invention provides a cable modem termination system (CTMS) in a cable modem network for handling traffic in a packet-switched integrated services network which supports a plurality of different service classes. The system comprises, among other things, means for determining an arrival time (T) and a service class priority ($P_{CM}$) associated with a received bandwidth request; means for assigning a respective priority index value ($P_{index}$) to the received bandwidth request, wherein the priority index value is calculated by subtracting a product of the $P_{CM}$ value from the T value; and means for enqueuing the received bandwidth request within a sorted queuing structure in an order based upon its $P_{index}$ value. An additional aspect of this embodiment includes means for calculating the priority index value ($P_{index}$) according to: $P_{index}=T-(P_{CM}*RIORITY\_WEIGHT)$, wherein the PRIORITY_WEIGHT value is a predetermined constant.

Additional features and advantages of the present invention will become apparent from the following description of its preferred embodiments, which descriptions should be take in conjunction with the accompanying drawings.

BRIEF DESCRIPTION OF THE DRAWINGS

FIG. 6A illustrates a flow diagram of the technique of the present invention for handling differentiated priority bandwidth requests in a cable modem network.

FIG. 6B illustrates a flow diagram of the technique of the present invention for handling differentiated priority packets in an IP network.

DETAILED DESCRIPTION OF PREFERRED EMBODIMENT

Figure 1:
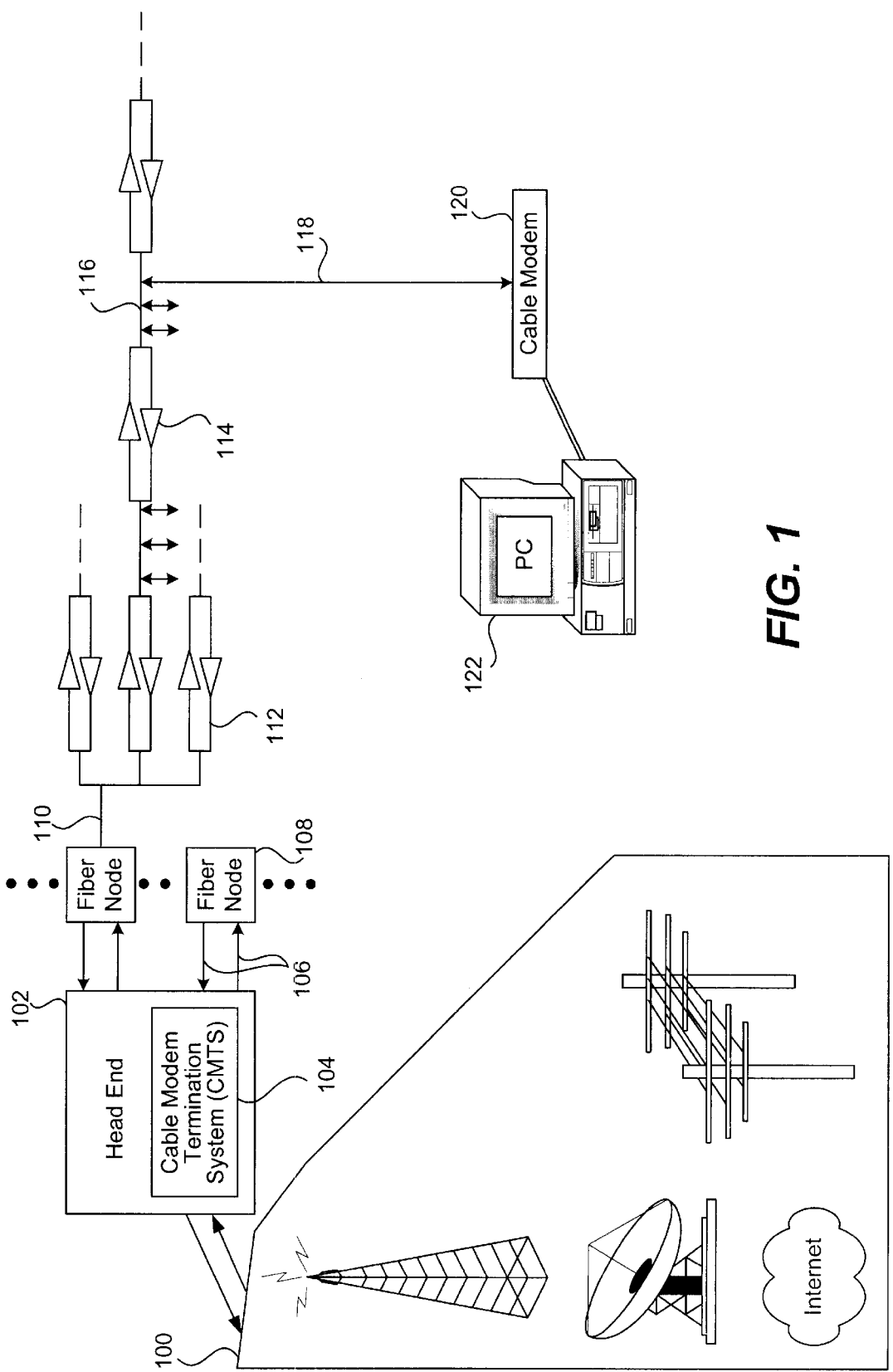
FIG. 1 is a block diagram of a two-way hybrid fiber-coaxial (HFC) cable system utilizing a cable modem for data transmission.

The technique of the present invention provides a simple and efficient solution to the problem of supporting tiered or differentiated priority levels within a QoS service class without starvation of lower priority traffic within that service class. The technique of the present invention may be implemented in a variety of packet-switched networks which support a plurality of different service classes. These packet-switched networks include both cable networks and linked networks such as IP networks, LANs, WANs,. etc. For purposes of illustration, the technique of the present invention will be described with respect to bandwidth requests within a cable modem network. However, it is to be understood that the technique of the present invention may be applied to other types of packet-switched networks including IP networks, ATM networks, etc.

Cable Network Architecture

The cable TV industry has been upgrading its signal distribution and transmission infrastructure since the late 1980s. In many cable television markets, the infrastructure and topology of cable systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable head end, i.e. a distribution hub, which received analog signals for broadcast from various sources such as satellites, broadcast transmissions, or local TV studios. Coaxial cable from the head end was connected to multiple distribution nodes, each of which could supply many houses or subscribers. From the distribution nodes, trunk lines (linear sections of coaxial cable) extended toward remote sites on the cable network. A typical trunk line is about 10 kilometers. Branching off of these trunk lines were distribution or feeder cables (40% of the system's cable footage) to specific neighborhoods, and drop cables (45% of the system's cable footage) to homes receiving cable television. Amplifiers were provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the head end of a particular cable system is broadcast to all subscribers on that cable system. The subscriber simply needed a television with an appropriate cable receptor to receive the cable television signal. The cable TV signal was broadcast at a radio frequency range of about 60 to 700 MHz. Broadcast signals were sent downstream; that is, from the head end of the cable system across the distribution nodes, over the trunk line, to feeder lines that led to the subscribers. However, the cable system did not have installed the equipment necessary for sending signals from subscribers to the head end, known as return or upstream signal transmission. Not surprisingly, nor were there provisions for digital signal transmission either downstream or upstream.

In the 1980s, cable companies began installing optical fibers between the head end of the cable system and distribution nodes (discussed in greater detail with respect to FIG. 1). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be upto 80 kilometers, whereas a typical coaxial trunk line is about 10 kilometers, as mentioned above. Prior to the 1990s, cable television systems were not intended to be general-purpose communications mechanisms. Their primary purpose was transmitting a variety of entertainment television signals to subscribers. Thus, they needed to be one-way transmission paths from a central location, known as the head end, to each subscriber's home, delivering essentially the same signals to each subscriber. HFC systems run fiber deep into the cable TV network offering subscribers more neighborhood specific programming by segmenting an existing system into individual serving areas between 500 to 2,000 subscribers. Although networks using exclusively fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way hybrid fiber-coaxial (HFC) cable system utilizing a cable modem for data transmission. It shows a head end 102 (essentially a distribution hub) which can typically service about 40,000 subscribers. Head end 102 contains a cable modem termination system (CMTS) 104 that is needed when transmitting and receiving data using cable modems. Block 104 of FIG. 1 represents a cable modem termination system connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate Media Access Control (MAC) level packet headers (as specified by the MCNS standard discussed below) for data received by the cable system, (3) modulating and demodulating the data to and from the cable system, and (4) converting the electrical signal in the CMTS to an optical signal for transmission over the optical lines to the fiber nodes.

Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction (frequency ranges for upstream and downstream paths are discussed below). Each fiber node 108 can normally service upto 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data is attractive for a number of reasons. Most notably, they provide upto a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

Time to Transmit a Single 500 kbyte Image

| | |
|---|---|
| Telephone Modem (28.8 kbps) | 6–8 minutes |
| ISDN Line (64 kbps) | 1–1.5 minutes |
| Cable Modem (30 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

Digital data on the upstream and downstream channels is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been an increased focus on performance, reliability, and improved maintenance of such systems. In sum, cable companies are in the midst of a transition from their traditional core business of entertainment video programming to a position as a full service provider of video, voice and data telecommunication services. Among the elements that have made this transition possible are technologies such as the cable modem.

Although not fully agreed to by all parties in the cable TV and cable modem industry, an emerging standard establishing the protocol for two-way communication of digital data on cable systems has been defined by a consortium of industry groups. The protocol, known as the Multimedia Cable Network System (MCNS), specifies particular standards regarding the transmission of data over cable systems.

Figure 2:
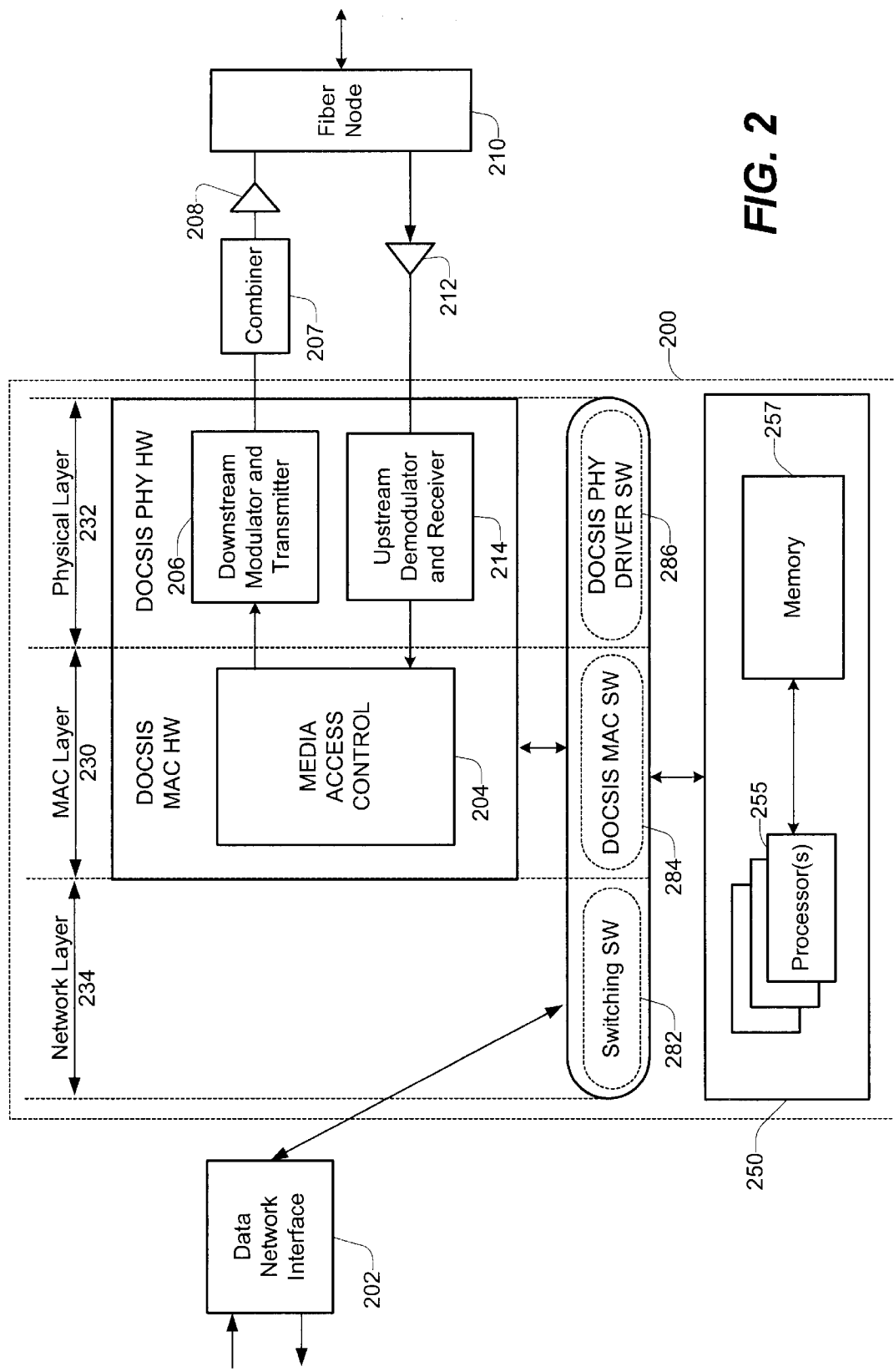
FIG. 2 is a schematic block diagram of a Cable Modem Termination System (CMTS) implemented as part of the Head End of a cable network.

FIG. 2 provides a schematic block diagram illustrating the basic components of a Cable Modem Termination System (CMTS), represented by block 200. In a specific embodiment as shown, for example, in FIG. 2, the CMTS implements three network layers, including a physical layer 232, a Medial Access Control (MAC) layer 230, and a network layer 234. When a modem sends a packet of information (e.g. data packet, voice packet, etc.) to the CMTS, the packet is received at fiber node 210. Each fiber node 210 can generally service about 500 subscribers, depending on bandwidth. Converter 212 converts optical signals transmitted by fiber node 210 into electrical signals that can be processed by upstream demodulator and receiver 214. The upstream demodulator and receiver 214 is part of the CMTS physical layer 232. Generally, the physical layer is responsible for receiving and transmitting RF signals on the HFC cable plant. Hardware portions of the physical layer include downstream modulator and transmitter 206 and upstream demodulator and receiver 214. The physical layer also includes device driver software 286 for driving the hardware components of the physical layer.

Once an information packet is demodulated by the demodulator/receiver 214, it is then passed to MAC layer 230. A primary purpose of MAC layer 230 is to coordinate channel access of multiple cable modems sharing the same cable channel. The MAC layer 230 is also responsible for encapsulating and de-encapsulating packets within a MAC header according to the DOCSIS standard for transmission of data or other information. This standard is currently a draft recommendation (J.isc Annex B) which has been publicly presented to Study Group 9 of the ITU in October 1997, and is known to a person in the cable modem data communication field.

MAC layer 230 includes a MAC hardware portion 204 and a MAC software portion 284, which function together to encapsulate information packets with the appropriate MAC address of the cable modem(s) on the system. Note that there are MAC addresses in the cable modems which encapsulates data or other information to be sent upstream with a header containing the MAC address of the hub associated with the particular cable modem sending the data.

Each cable modem on the system has its own MAC address. Each cable modem on the system has its own MAC address. Whenever a new cable modem is installed, its address is registered with MAC layer 230. The MAC address is important for distinguishing data sent from individual cable modems to the CMTS. Since all modems on a particular channel share a common upstream path, the CMTS 204 uses the MAC address to identify and communicate with a particular modem on a selected upstream channel. Thus, data packets, regardless of format, are mapped to a particular MAC address. MAC layer 230 is also responsible for sending out polling messages as part of the link protocol between the CMTS and each of the cable modems on a particular channel. These polling messages are important for maintaining a communication connection between the CMTS and the cable modems.

After the upstream information has been processed by MAC layer 230, it is then passed to network layer 234. Network layer 234 includes switching software 282 for causing the upstream information packet to be switched to an appropriate data network interface on data network interface 202.

When a packet is received at the data network interface 202 from an external source, the switching software within network layer 234 passes the packet to MAC layer 230. MAC block 204 transmits information via a one-way communication medium to a downstream modulator and transmitter 206. Downstream modulator and transmitter 206 takes the data (or other information) in a packet structure and modulates it on the downstream carrier using, for example, QAM 64 modulation (other methods of modulation can be used such as CDMA {Code Division Multiple Access} OFDM {Orthognal Frequency Divison Multiplexing}, FSK {FREQ Shift Keying}). The return data is likewise modulated using, for example, QAM 16 or QSPK. These modulations methods are well-known in the art.

Downstream Modulator and Transmitter 206 converts the digital packets to modulated downstream RF frames, such as, for example, MPEG or ATM frames. Data from other services (e.g. television) is added at a combiner 207. Converter 208 converts the modulated RF electrical signals to optical signals that can be received and transmitted by a Fiber Node 210 to the cable modem hub.

It is to be noted that alternate embodiments of the CMTS (not shown) may not include network layer 234. In such embodiments, a CMTS device may include only a physical layer and a MAC layer, which are responsible for modifying a packet according to the appropriate standard for transmission of information over a cable modem network. The network layer 234 of these alternate embodiments of CMTS devices may be included, for example, as part of a conventional router for a packet-switched network.

In a specific embodiment, the network layer of the CMTS is configured as a cable line card coupled to a standard router that includes the physical layer 232 and MAC layer 230. Using this type of configuration, the CMTS is able to send and/or receive IP packets to and from the data network interface 202 using switching software block 282. The data network interface 202 is an interface component between external data sources and the cable system. The external data sources (item 100 of FIG. 1) transmit data to the data network interface 202 via, for example, optical fiber, microwave link, satellite link, or through various media. The data network interface includes hardware and software for interfacing to various networks such as, for example, Ethernet, ATM, frame relay, etc.

As shown in FIG. 2, CMTS 204 also includes a hardware block 250 which interacts with the software and other hardware portions of the various layers within the CMTS. Block 250 includes one or more processors 255 and memory 257. The memory 257 may include, for example, I/O memory (e.g. buffers), program memory, shared memory, etc. Hardware block 250 may physically reside with the other CMTS components, or may reside in a machine or other system external to the CMTS. For example, the hardware block 250 may be configured as part of a router which includes a cable line card.

Basic data connectivity on the cable system typically requires a single upstream channel (to carry return signals from the cable modem to the cable head-end) and a single downstream channel carrying signals from the head-end to the cable modems. A cable access network typically comprises multiple upstream channels and multiple downstream channels.

Protocols that enable high-speed data access over cable modem networks typically employ a shared time-slotted access scheme for the upstream channel. Whenever a cable modem wishes to send data upstream, it first sends a bandwidth request to the head end, clearly specifying the size of the time-slice it needs to send the data packet. The head end then schedules a data grant for this cable modem at some later time on the upstream channel.

On the downstream cable data channel, data is broadcast by a single head-end (CMTS) to cable modems served on that downstream channel. However, the upstream channel is complicated by the fact that it is used as a multiple access channel which is shared by the large group of cable modems (on that channel) to communicate with the CMTS. The upstream channel is time-slotted and cable modems need to contend for gaining access to the CMTS in this shared channel.

As mentioned previously, each DOCSIS upstream cable channel is time-slotted. The basic unit of scheduling is a minislot. The CMTS remotely schedules each and every minislot on the upstream channel. Some contiguous minislots are grouped together as a unicast data slot meant to be used by a specific cable modem for sending its data upstream. Some minislots are marked as contention slots that can be used by any cable modem to send ranging/bandwidth requests upstream to the CMTS. The CMTS conveys this minislot allocation information (to the set of modems sharing the upstream channel) ahead of time using bandwidth allocation MAP messages which are periodically broadcast on the downstream channel. In general any given upstream channel [i] includes two logical sub-channels: a contention sub-channel comprising contention minislots which can be used by any cable modem, and a reservation or grant sub-channel comprising minislots allocated to specific cable modems. This is shown, for example, in FIG. 3 of the drawings.

Figure 3A:
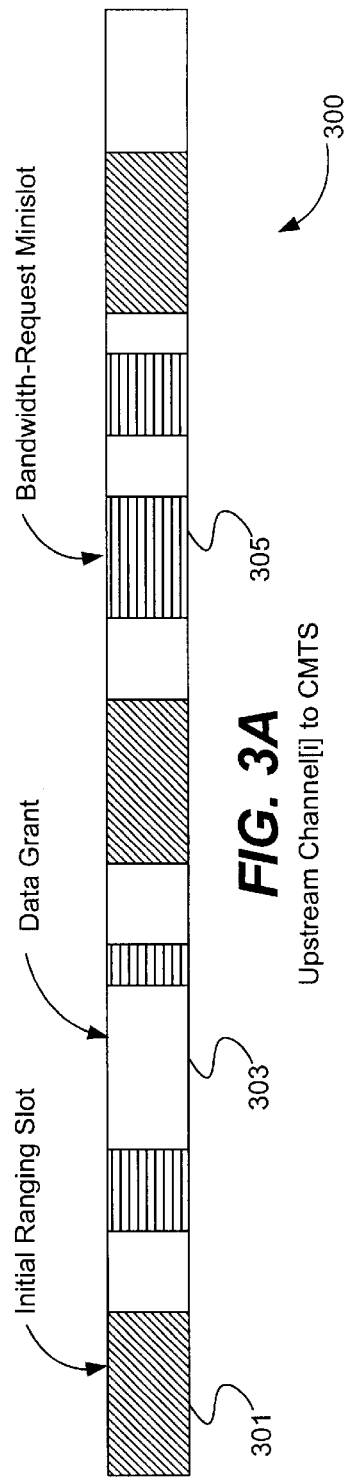
FIG. 3A shows an example of various mini slots which are included within an upstream channel from the cable modems to the CMTS.
Figure 3B:
FIGS. 3B and 3C illustrate initial ranging and bandwidth request sub-channels, respectively, which form a part of the upstream channel 300 of FIG. 3A.
Figure 3C:
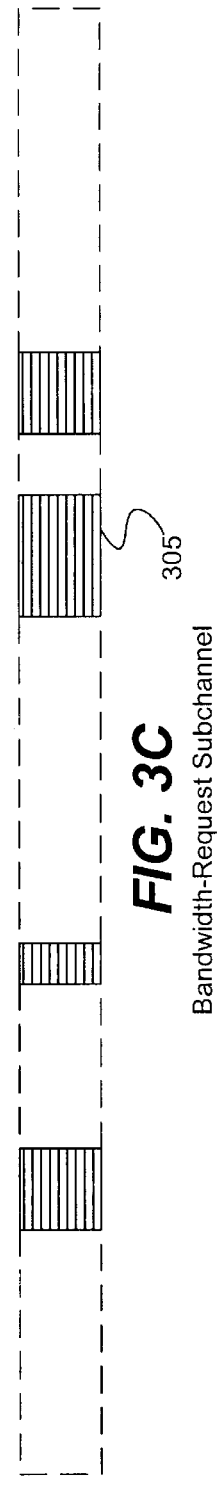

FIG. 3A illustrates the various types of minislots allocated by the CMTS on the upstream channel [i] 300. FIGS. 3B and 3C illustrate the initial ranging subchannel and bandwidth-request subchannel which are included in the upstream channel 300 of FIG. 3A.

There are two basic types of contention slots allocated by the CMTS on the upstream, each being used for a different purpose by the cable modems. A first type of contention slot is an Initial Ranging Slot, identified in FIG. 3A as slot 301. This contention slot on the upstream is made up of a group of minislots forming a 2 ms wide time slice. This region is intended to be used only by "new" cable modems during their cable interface initialization phase to join the HFC network, such as, for example, during initial powering up of the cable modem. Once the CMTS receives an initial ranging request from a new modem in this type of slot, the CMTS subsequently polls the modem (along with other modems identified in the network) using unicast (non-contention) station maintenance slots (not shown in FIG. 3).

A second type of contention slot is a Bandwidth-Request Minislot. The CMTS marks some of the upstream minislots as contention based bandwidth-request minislots, as shown, for example, by slot 305 of FIG. 3A. Any cable modem having upstream data to send, can/will use this type of minislot to request the CMTS for a data grant (slot 303, FIG. 3A) in which to send its actual data in non-contention mode. The stream of initial ranging slots and the bandwidth-request slots form two independent contention subchannels on each upstream channel as shown in FIGS. 3B and 3C, namely the initial ranging subchannel and bandwidth-request subchannel, respectively. For purposes of simplification, initial ranging slots and bandwidth-request slots will collectively be referred to as "contention slots" or "contention minislots."

Additionally, for simplification purposes, and to avoid confusion, the "[i]" portion of the upstream or downstream channel and/or elements related thereto may not be included in parts of the discussion below. It is to be understood, however, that the techniques described herein with respect to a particular channel may also be applied to other channels in the network.

Each cable modem in the network is assigned an exclusive service ID which allows the CMTS 204 to identify the particular cable modem associated with a received request on a particular upstream channel [i]. For purposes of simplification, it will be assumed that each cable modem corresponds to a particular subscriber in the cable modem network. In networks where differentiated service classes are supported, each subscriber may choose to pay for a particular grade of service within that service class. Although the technique of the present invention will be described in terms of handling bandwidth requests associated with tiered or differentiated best-effort service, it is to be understood that the technique of the present invention may be applied to any QoS service class having differentiated priority levels within that service class.

Each cable modem within a particular channel [i] is assigned a certain static priority value ($P_{CM}$) which represents the grade of service associated with each cable modem or subscriber. The number of different priority values is preferably equal to the number of grades of service that the service provider wishes to support at the CMTS. For purposes of illustration, it will be assumed that the tiered best-effort service class offers eight distinct grades of service, ranging from highest priority (P7) to lowest priority (P0).

The process begins with a bandwidth request being sent on the upstream channel by a cable modem on the subscriber end. When the bandwidth request is received at the cable modem head end, the service ID of that particular cable modem is identified. From this service ID, the associated static priority value ($P_{CM}$) of the requesting modem's service class is determined. The grant scheduler at the CMTS maintains a single priority queuing structure to temporarily store received bandwidth requests (for best-effort type service) from cable modems on a channel [i]. The technique of the present invention implements a procedure to calculate a metric used in determining a queuing priority for the received bandwidth requests so that a single priority queuing structure may be used for this purpose. The metric is a function of the associated static priority value ($P_{CM}$) and arrival time (T) of each respective bandwidth request received at the head end. Use of the static service class priority in the queuing priority metric helps the grant scheduler to prioritize bandwidth requests from high priority modems over requests from low priority modems in the same queuing structure. Use of the arrival time in the metric enables an implicit fairness feature in the traffic prioritization. A low priority bandwidth request may remain deferred in the common queuing structure for a later grant, but only for a definite amount of time (which is configurable). After this amount of time has elapsed, the priority metric of the low priority bandwidth request will be superior to that of newer, higher priority bandwidth requests, resulting in the low priority bandwidth request being processed ahead of the more recently arrived higher priority bandwidth requests (which have a lower priority metric). In this way, starvation of lower priority traffic is avoided.

Figure 5:
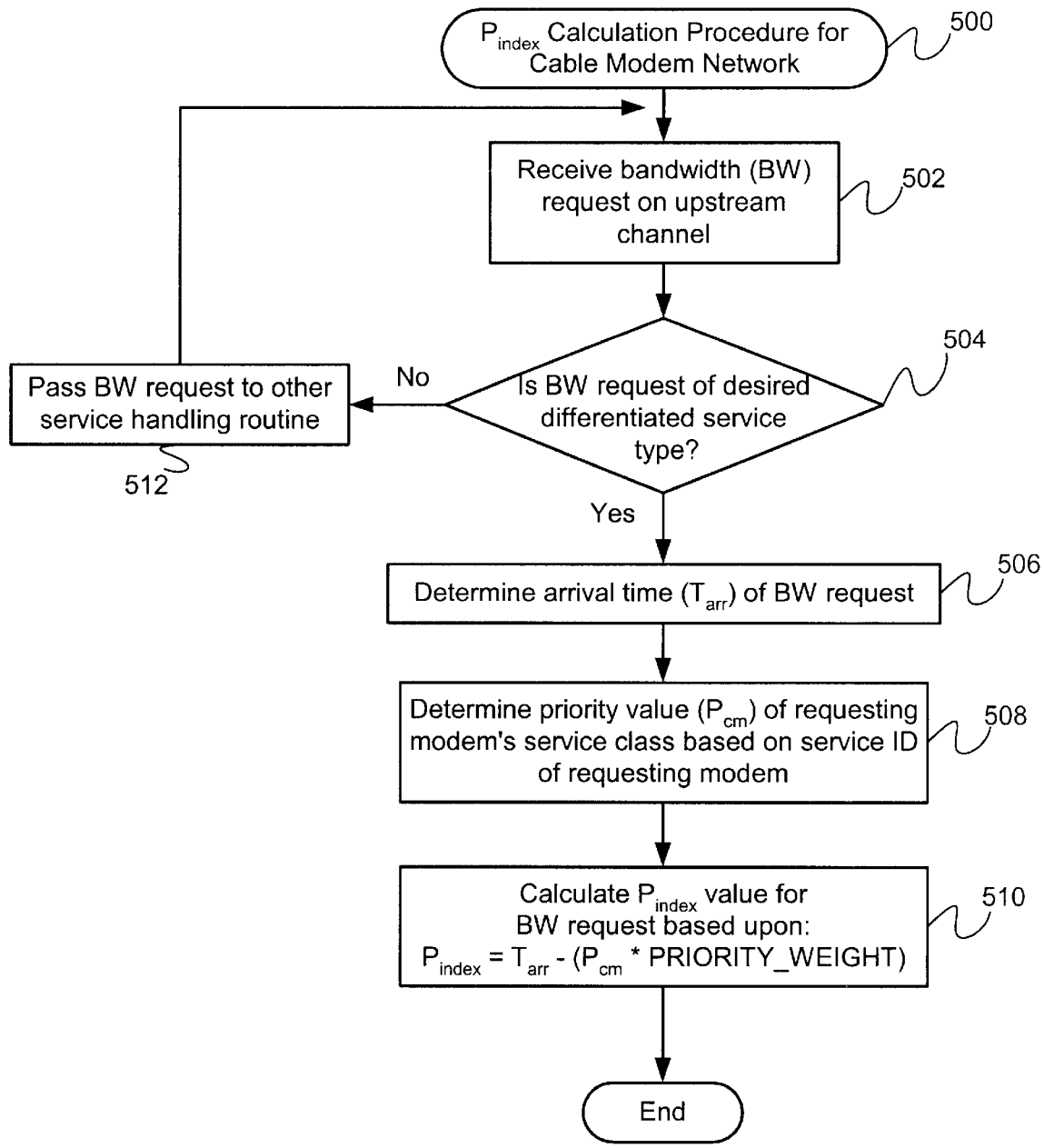
FIG. 5 shows a flow diagram illustrating the technique of the present invention for calculating a $P_{index}$ value for a received bandwidth request in a cable modem network.

FIG. 5 shows a flow diagram of one aspect of the present invention for calculating a priority index value for received bandwidth requests in a cable modem network. The priority index value ($P_{index}$) calculated by procedure 500 of FIG. 5 corresponds to the queuing priority metric described above.

At block 502, a bandwidth request on the upstream channel from a subscriber modem is received at the cable modem head end. At block 504 an inquiry is made as to whether the bandwidth request is of the desired differentiated service class. For example, one type of differentiated service class is tiered best-effort service. Applying this example to FIG. 5, at block 504 an inquiry is made as to whether the received bandwidth request is of the tiered best-effort type (which, in this case, is the desired differentiated service class). If the bandwidth request is not of the desired differentiated service class (e.g., is not of the tiered best-effort type of service), the bandwidth request is passed to a different service handling routine at block 512.

If, however, the received bandwidth request is of the desired differentiated service class type (e.g. is of the best-effort type of service), then, at block 506, the arrival time ($T_{arr}$) of the bandwidth request is read from a timestamp register. As described in greater detail below, this $T_{arr}$ value is used to compute a respective priority index value associated with that particular bandwidth request,.

In a specific embodiment, the numeric value of $T_{arr}$ is derived from a 64-bit number or register which represents the arrival time in milliseconds of a received bandwidth request at the CMTS. The 64-bit number will be uniquely different for each received bandwidth request. In an alternate embodiment (not shown), a 32-bit timestamp may be used. However, use of a 32-bit timestamp slightly complicates the prioritization technique of the present invention, as will be discussed in greater detail below.

It is to be noted that use of other timing units such as, for example, Julian Calendar units may be employed in alternate embodiments of the present invention. Moreover, any relevant timing unit known to those skilled in the relevant art may be used so long as the timing unit provides a relative reference of the chronological order of received bandwidth requests. As will become apparent from the discussion below, it is also preferable that the $T_{arr}$ value be a numeric value, or at least have a numeric value associated therewith.

At block 508, the priority value ($P_{CM}$) of the requesting cable modem's differentiated service class is determined based upon its service ID. Thus, for example, in a tiered best-effort service class environment having priority levels 0–7, a particular cable modem issuing a bandwidth request will have an associated priority value (for example $P_{CM}=P7$) corresponding to its selected grade of differentiated service. The cable modem's $P_{CM}$ value is associated with that modem's service ID (which is used by the CMTS to uniquely identify that particular modem). Thus, when a bandwidth request is received at the CMTS, the service ID of the modem issuing the bandwidth request is identified, which then allows the $P_{CM}$ value of the requesting modem to be determined.

At block 510, a priority index value ($P_{index}$) is calculated for the received bandwidth request, according to the formula:

$$P_{index}=T_{arr}-(P_{CM}*\text{PRIORITY\_WEIGHT}). \quad (1)$$

The variable PRIORITY_WEIGHT is a predetermined constant which may be varied to increase or decrease the relative importance of each differentiated priority level. From the above equation (1) it can be seen that the product of the $P_{CM}$ value will be increased if the value of the PRIORITY_WEIGHT parameter is increased. This, in turn, yields a lower $P_{index}$ value. Thus, the PRIORITY_WEIGHT parameter may be used to determine the weight of importance of each differentiated priority level within the service class. In a specific embodiment, the PRIORITY_WEIGHT value is equal to 128. Setting the PRIORITY_WEIGHT value to a power of 2 is additionally advantageous in that it allows for very fast calculation of the product $P_{CM}*$PRIORITY_WEIGHT. For example, multiplication of the $P_{CM}$ by 128 may be easily achieved by shifting the binary representation of the $P_{CM}$ value 7 bits to the left.

Once the priority index value for a received bandwidth request has been calculated according to the above-described formula, it is then enqueued within a sorted data structure using the value of the associated $P_{index}$ parameter to establish queuing priority within the structure, as shown in block 602 of FIG. 6A. It is to be noted that, in a specific embodiment, the $P_{index}$ value is stored as a 64-bit number.

FIG. 6A shows one aspect of the technique of the present invention for enqueuing and dequeuing differentiated priority bandwidth requests within a common, sorted data structure. Once the $P_{index}$ parameter has been calculated for a particular received bandwidth request, at block 602, the bandwidth request is enqueued within a sorted data structure using the value of its associated $P_{index}$ parameter to establish its queuing priority. The queued bandwidth requests within the sorted data structure are dequeued in an order based upon the respective $P_{index}$ values. In a specific embodiment of the present invention (shown, for example, in FIG. 7) bandwidth requests having a lowest associated $P_{index}$ value are dequeued and serviced before bandwidth requests having relatively higher $P_{index}$ values.

As stated previously, in a specific embodiment, the arrival time $T_{arr}$ is obtained from a 64-bit timestamp register. If, however, use of a 32-bit timestamp is preferred, the enqueuing routine for a received bandwidth request in the common priority queue may also involve checking a timebase flag before a performing a comparison of the $P_{index}$ values of the element to be queued and existing element(s) in the queue. This checking ensures proper ordering even across a wrap-around of the 32-bit time base.

Figure 4:
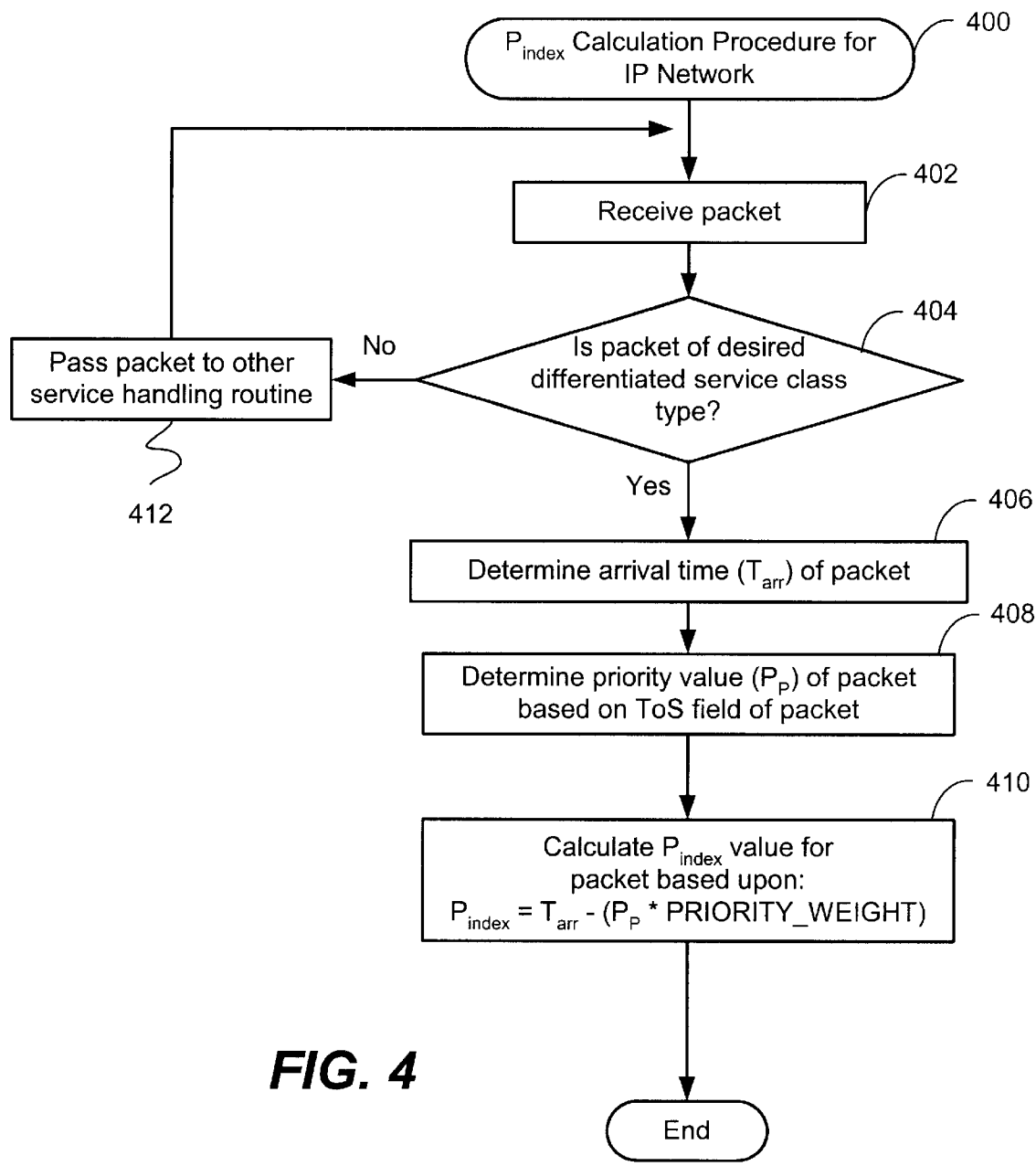
FIG. 4 shows a flow diagram illustrating the technique of the present invention for calculating a $P_{index}$ value for a packet in an IP network.

It is to be noted that each of the procedures shown in FIGS. 4, 5, and 6 may be implemented via software within the cable head end 102 (FIG. 1). The technique of the present invention may also be implemented in a variety of packet-switched networks other than cable modem networks. For example, the technique of the present invention may be used to handle differentiated priority packets in an nodal/link-based networks such as, for example, IP networks.

Figure 9:
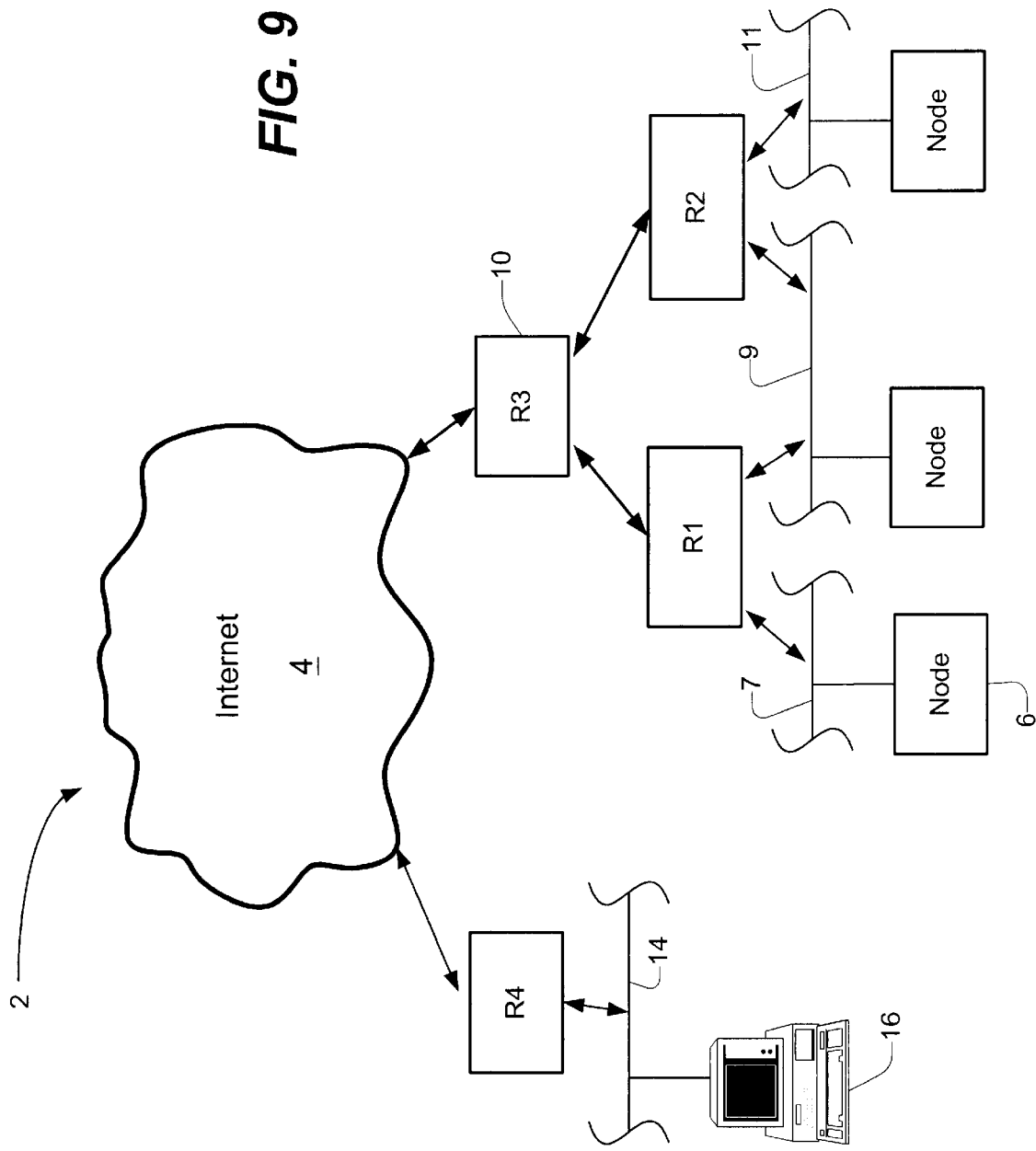
FIG. 9 shows a diagram of an IP network, which is an example of one type of packet-switched network in which the technique of the present invention may be implemented.

FIG. 9 shows a diagram of an IP network, which is an example of one type of flow-based network in which the technique of the present invention may be implemented. A flow can be a hard-state virtual circuit in an ATM network, a soft-state flow in an IP network (e.g., a MPLS tunnel), or a stateless connection as a TCP/IP connection in today's Internet. As shown in FIG. 1, the IP network 2 includes the Internet (or a WAN) 4 over which a Node 16 (e.g. a computer) can communicate with a separate node 6 via a plurality of intermediate nodes (e.g. R1, R3, R4). Node 6 may be, for example, a server which is part of Local Area Network (LAN) 7, connected to the Internet via routers R1 and R3. Router R3 (10) may, in turn, connect one or more other routers (e.g., router R2) with the Internet.

A LAN is a communication network that serves users within a confined geographical area. It is made up of servers, workstations, a network operating system and a communications link. Servers are high-speed machines that hold programs and data shared by all network users. The workstations, or clients, are the users' personal computers, which perform stand-alone processing and access the network servers as required. The controlling software in a LAN is the network operating system, such as, for example, NetWare, UNIX, and Appletalk, which resides in the server. Message transfer is managed by a transport protocol such as, for example, IPX, SPX, SNA and TCP/IP. The physical transmission of data is performed by the access method (Ethernet, Token Ring, etc.) which is implemented in the network adapters that plug into the machines. The actual communications path is the cable (twisted pair, coax, optical fiber) that interconnects each network adapter.

In order to reduce design complexity, most networks are organized as a series of hardware and software levels or "layers" within each node. These layers interact to format data for transfer between, e.g., a source node and a destination node communicating over the network. More specifically, predetermined services are performed on the data as it passes through each layer and the layers communicate with each other by means of the predefined protocols. This layered design permits each layer to offer selected services to other layers using a standardized interface that shields those layers from the details of actual implementation of the services. The use and implementation of conventional layered designs is commonly known to those skilled in the art, and therefore will not be described in greater detailed in this application.

Generally, the bandwidth request prioritization technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid bandwidth request prioritization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example.

Specific examples of such network devices include routers and switches. For example, the bandwidth request prioritization systems of this invention may be specially configured routers such as specially configured router models 1600, 2500, 2600, 3600, 4500, 4700, 7200, 7500, and 12000 (available from Cisco Systems, Inc. of San Jose, Calif.). A general architecture for some of these machines will appear from the description given below. In an alternative embodiment, the bandwidth request prioritization system may be implemented on a general-purpose network host machine such as a personal computer or workstation. Further, the invention may be at least partially implemented on a card (e.g., an interface card) for a network device or a general-purpose computing device.

Figure 10:
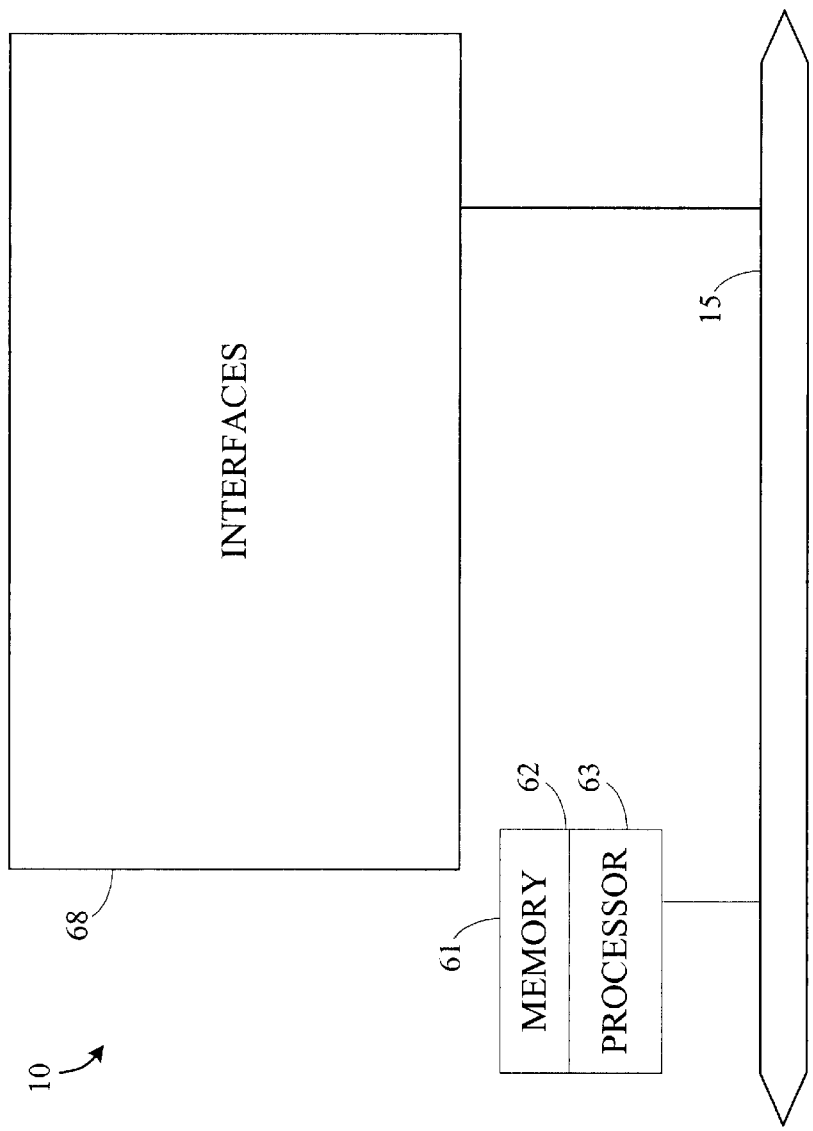
FIG. 10 is a block diagram of a router that may be used in conjunction with the technique of the present invention.

Referring now to FIG. 10, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for encapsulating, de-encapsulating packets, calculating priority index values, queuing packets, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 10 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 61) configured to store program instructions for the general-purpose network operations and other functions of the present invention described herein. The program instructions may control the operation of an operating system and/or one or more applications, for example. The memory or memories may also be configured to store data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

FIGS. 4 and 6B illustrate flow diagrams which may be implemented in software form within router 10 of FIG. 10.

FIG. 4 shows one aspect of the present invention for calculating a $P_{index}$ value for packets received in an IP network. The $P_{index}$ calculation procedure 400 of FIG. 4 is similar in concept to procedure 500 of FIG. 5. At block 402, a packet or IP datagram is received at router 10 (FIG. 9). At block 404, an inquiry is made as to whether the packet is of the desired differentiated service class. If the packet is not of the desired differentiated service class, then at block 412, the packet is passed to a different service handling routine. If the received packet is of the desired differentiated service class type, then, at block 406, the associated $T_{arr}$ parameter for the received packet is set equal to the arrival time of the packet (in milliseconds).

Aspects relating to the $T_{arr}$ parameter of block 406 are similar to those described in block 506 of FIG. 5, and therefore will not be discussed in greater detail. However, it is to be noted that, in the specific embodiments of FIGS. 4 and 5, the $T_{arr}$ value is obatined from a global timestamp register, clock or other timing device. The function responsible for computing the priority index ($P_{index}$) of the bandwidth request/IP packet reads the time stamp register in a local 64 bit variable, and uses it in the local priority index calculation. In a specific embodiment, this function is called when the bandwidth request/IP packet is being processed/declassified. The bandwidth request/IP packet is then stamped with its calculated priority index value, and enqueued in the sorted queue data structure.

At block 408, the priority value ($P_P$) of the packet is determined based on the Type of Service (ToS) field associated with that packet. The ToS field in a packet or IP datagram specifies the differentiated service level to which that packet or datagram belongs. In alternate embodiments, where no ToS field is provided, a different technique or algorithm may be used to determine the respective priority level and associated numeric priority value of a received packet. Many of these algorithms or techniques are commonly known to those skilled in the art and therefore will not be discussed in greater detail in the present application.

At block 410, the $P_{index}$ value for the received packet is calculated based upon the formula:

$$P_{index} = T_{arr} - (P_P * \text{PRIORITY\_WEIGHT}), \qquad (2)$$

where the PRIORITY_WEIGHT value is a predetermined constant.

The technique of calculating the $P_{index}$ value for a packet in block 410 of FIG. 4 is similar to the technique described in block 510 of FIG. 5, and therefore will not be described in further detail.

FIG. 6B shows a flow diagram illustrating one aspect of the present invention for enqueuing and dequeuing differentiated priority packets within an IP network. The differentiated priority packet handling procedure 650 of FIG. 6B is similar to procedure 600 of FIG. 6A, and therefore will not be described in great detail.

At block 652, the packet is enqueued within a sorted data structure using the value of its associated $P_{index}$ parameter to establish queuing priority within the structure. It is to be noted that, in the specific embodiments of FIGS. 4 and 5, the packet (or bandwidth request) is enqueued along with its associated $P_{index}$ value within the sorted data structure.

As with procedure 600 (FIG. 6A), a variety of data structures may be used to implement the priority queue, depending upon the specific parameters of the particular packet-switched network used. For example, typical sorted data structures include a sorted linked list (useful for shallow queues), a priority queue, a calendar queue (reduces runtime processing involved when enqueuing the element in a sorted linked list), a binary tree, and a binary heap. The particular queuing structure used for implementing the technique of the present invention in either the cable modem network or IP network will, of course, vary depending upon the specific parameters of the particular packet-switched network utilized. In a specific embodiment of the present invention (show, for example in FIG. 7), a sorted priority queue is used, while an alternate embodiment of the present invention (not shown) may utilize a sorted binary tree. Other sorted data structures other than those mentioned above which are commonly known to those skilled in the art may also be used where appropriate.

At block 654, packets within the sorted data structure are dequeued in an order based upon their relative $P_{index}$ values. In a specific embodiment of the present invention (shown, for example, in FIG. 7), packets with the lowest $P_{index}$ values are dequeued ahead of packets having relatively higher $P_{index}$ values.

ILLUSTRATIVE EXAMPLE

Figures 7A, 7B:
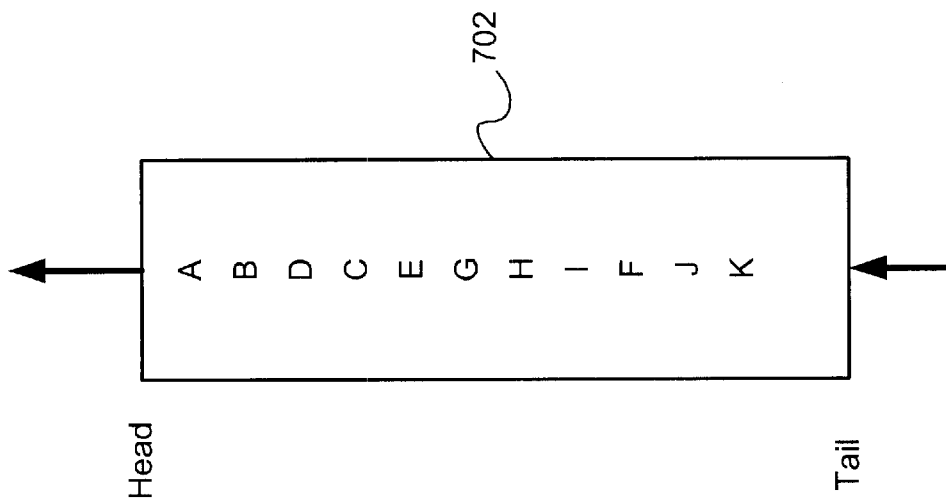
FIGS. 7A and 7B show an example of how the technique of the present invention is used to handle differentiated priority bandwidth requests within a tiered best-effort service class.

FIGS. 7A and 7B provide an example of how the technique of the present invention is implemented in a sorted priority queue 702. In FIG. 7A a plurality of bandwidth requests (A-K) are received at the cable modem head end. Each respective bandwidth request has an associated priority level and arrival time. For example, bandwidth request A has an associated priority level P7, meaning that its associated numeric priority value ($P_{CM}$) is equal to 7. Its arrival time ($T_{arr}$) is equal to 100. From this information, the $P_{index}$ value for bandwidth request A is calculated according to block 501 of FIG. 5, as shown below:

$$P_{index}[A] = T_{arr} - (P_{CM} * \text{PRIORITY\_WEIGHT})$$

$$= 100 - (7 * 10)$$

$$= 30$$

It is noted that the PRIORITY_WEIGHT value for the example of FIGS. 7A and 7B is equal to 10. The $P_{index}$ values for bandwidth requests B-K are calculated in a similar manner to that shown above. Thus, the table of FIG. 7A shows each bandwidth request and its associated $P_{index}$ value in accordance with the technique of the present invention.

In FIG. 7B, each of the bandwidth requests shown in FIG. 7A is enqueued within a single sorted priority queue 702 according to its respective $P_{index}$ value. Bandwidth requests having relatively lower $P_{index}$ values are queued ahead of bandwidth requests having relatively higher $P_{index}$ values. Bandwidth requests within queue 702 are serviced in an order from head to tail, meaning that bandwidth requests with the relatively lowest $P_{index}$ values are dequeued and serviced first.

The technique for dequeuing requests from data structure 702 (FIG. 7B) is relatively simple. Essentially, the bandwidth request at the head of the queue is dequeued and processed by the grant scheduler at the cable modem head end, which allocates a grant in the upstream channel [i] MAP for the particular cable modem sending the request.

In contrast with prior art techniques which require a separate FIFO queue for each differentiated priority level, the technique of the present invention utilizes a single data structure (for each upstream channel [i]) which is highly scalable and can accommodate any number of differentiated priority levels within a service class. Moreover, the technique of the present invention is able to accommodate increases/decreases in the number of priority levels within the service class without the need to change or modify existing hardware or software within the packet-switched network. Additionally, the use of the technique of the present invention does not require a separate round robin server to cycle through multiple FIFO queues. Further, the present technique has an in-built fairness algorithm which prevents starvation of low priority bandwidth requests despite a continuous supply of high priority requests.

Figures 8A, 8B:
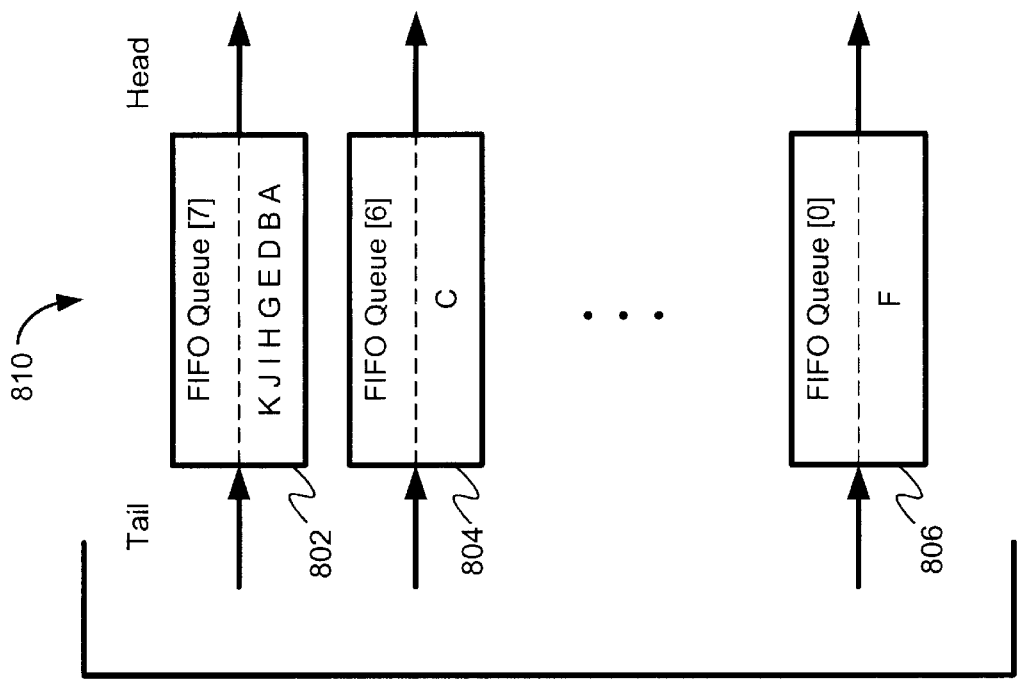
FIGS. 8A and 8B illustrate a conventional technique for handling differentiated priority bandwidth requests within a tiered best-effort service class.

For example, as shown in FIGS. 7A and 7B, bandwidth request F is of the lowest priority (P0), yet this request is received before bandwidth requests J and K, which are of the highest priority (P7). Conventionally, as shown in FIG. 8A and B, bandwidth requests J and K would be enqueued within high priority queue 802 and serviced by the round robin scheduler before servicing bandwidth request F, which is queued within the lowest priority queue 806 (FIG. 8B). In contrast, as shown in FIG. 7B, bandwidth request F is scheduled to be serviced ahead of requests J and K despite the fact that requests J and K are of higher priority. In this way, starvation of low priority requests is avoided.

Additionally, using the PRIORITY_WEIGHT parameter of the present invention, the degree of preferential treatment for servicing packets or bandwidth requests of one priority over those of another priority may be finely tuned. For example, in the above-described example with reference to bandwidth requests F, J, and K, if the priority weight value were increased from 10 to 20, the resulting $P_{index}$ value for bandwidth requests F, J, and K would be as follows:

$$P_{index}F = 120$$

$$P_{index}J = 60$$

$$P_{index}K = 70 \qquad (3)$$

Thus, as can be seen from the above table (3), where the priority weight value is increased to 20, bandwidth requests J and K now have relatively lower $P_{index}$ values than bandwidth request F, which means that requests J and K will be enqueued within data structure 702 ahead of request F. As a result, requests J and K will be serviced before request F.

Because the technique of the invention uses only a single, common data structure rather than multiple queuing structures (as used in conventional techniques) for queuing differentiated priority bandwidth requests or packets, the complexity of the bandwidth request or packet handling procedure is greatly reduced both via software and hardware implementation. Moreover, the present technique uses less memory since fewer data structures need to be allocated compared to conventional techniques. This also results in a decrease in the cost for implementing and maintain the bandwidth request/packet handling procedure.

The technique of the present invention uses a single data structure for implementing differentiated levels of service priority within a particular service class. The technique is easily scalable and can support any number of differentiated priority levels without incurring overhead of maintain separate data structures for each priority level within a particular service class. Additionally, since the present technique uses a single queuing structure, there is no need to rely on the use of an explicit round robin scheduler to service different priority queues. Further, by utilizing a queueing priority metric which implicitly ensures traffic prioritization, the present invention does not rely on the use of an explicit fairness algorithm to avoid starvation of low priority traffic. Such fairness algorithms are conventionally tied-in with the round robin scheduler for typical MAX-MIN fairness implementations.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A method for handling traffic in a packet-switched, integrated services network which supports a plurality of different service classes, the method comprising:

(a) receiving at a first arrival time (T1), a first bandwidth request, said first bandwidth request being associated with a first priority class of service (PCM1);

(b) receiving at a second arrival time (T2), a second bandwidth request, said second bandwidth request being associated with a second priority class of service (PCM2);

(c) calculating a respective priority index value for each received bandwidth request, said priority index value being a function of a difference between the arrival time and priority class of each respective bandwidth request; and (d) enqueuing said first and second bandwidth requests within a common data structure in an order based upon the priority index value of each respective bandwidth request.

2. The method of claim 1 further including servicing queued bandwidth requests within said data structure in an order based upon said priority index values.

3. The method of claim 1 wherein said first priority class and said second priority class each correspond to different levels of priority within a tiered best-effort service class.

4. The method of claim 1 further including:

identifying a respective priority class of service value ($P_{CM}$) and respective arrival time (T) for each received bandwidth request; and determining said respective priority index value for each received bandwidth request by calculating a difference between a product of said $P_{CM}$ value and said T value.

5. The method of claim 1 further including:

assigning to said first bandwidth request a first priority index ($P1_{index}$) within said data structure, said first priority index value being a function of said first arrival time and said first priority class; and assigning to said second bandwidth request a second priority index ($P2_{index}$) within said data structure, said second priority index value being a function of said second arrival time and said second priority class.

6. The method of claim 5 further including servicing queued bandwidth requests within said data structure such that bandwidth requests having relatively lower priority index values are serviced before bandwidth requests having relatively higher priority index values.

7. The method of claim 5 further including:

calculating said first priority index according to:
$P1_{index} = T_1 - (P_{CM1} * \text{PRIORITY\_WEIGHT})$; and calculating said second priority index according to:
$P2_{index} = T_2 - (P_{CM2} * \text{PRIORITY\_WEIGHT})$, wherein said PRIORITY_WEIGHT value is a predetermined constant.

8. The method of claim 5, wherein said first priority class ($P_{CM1}$) has a first numeric value associated therewith, said method including calculating the first priority index value by subtracting a product of said $P_{CM1}$ value from said $T_1$ value.

9. The method of claim 8, wherein said second priority class ($P_{CM2}$) has a second numeric value associated therewith, said method including calculating the second priority index value by subtracting a product of said $P_{CM2}$ value from the $T_2$ value.

10. A method for handling traffic in a packet-switched, integrated services network which supports a plurality of different service classes, the method comprising:

(a) receiving at a first arrival time (T1), a first packet, said first packet being associated with a first priority class of service (PP1);

(b) receiving at a second arrival time (T2), a second packet, said second packet being associated with a second priority class of service (PP2);

(c) calculating a respective priority index value for each received packet, said priority index value being a function of a difference between the arrival time and priority class of each respective packet;

(d) enqueuing said first and second packets within a common data structure in an order based upon the priority index value of each respective packet; and (e) servicing queued packets within said data structure in an order based upon said priority index values.

11. The method of claim 10 wherein said first priority class and said second priority class each correspond to different levels of priority within a tiered best-effort service class.

12. The method of claim 10 further including:

identifying a respective priority class of service value ($P_P$) and respective arrival time (T) for each received packet; and determining said respective priority index value for each received packet by by calculating a difference between a product of said $P_P$ value and said T value.

13. The method of claim 10 further including:

assigning to said first packet a first priority index ($P1_{index}$) within said data structure, said first priority index value being a function of said first arrival time and said first priority class; and assigning to said second packet a second priority index ($P2_{index}$) within said data structure, said second priority index value being a function of said second arrival time and said second priority class.

14. The method of claim 13 further including servicing queued packets within said data structure such that packets having relatively lower priority index values are serviced before packets having relatively higher priority index values.

15. The method of claim 13 further including:
calculating said first priority index according to:
$P1_{index} = T_1 - (P_{P1} * \text{PRIORITY\_WEIGHT})$; and
calculating said second priority index according to:
$P2_{index} = T_2 - (P_{P2} * \text{PRIORITY\_WEIGHT})$, wherein said PRIORITY_WEIGHT value is a predetermined constant.

16. The method of claim 13, wherein said first priority class ($P_{P1}$) has a first numeric value associated therewith, said method including calculating the first priority index value by subtracting a product of said $P_{P1}$ value from the $T_1$ value.

17. The method of claim 16, wherein said second priority class ($P_{P2}$) has a second numeric value associated therewith, said method including calculating the second priority index value by subtracting a product of said $P_{P2}$ value from the $T_2$ value.

18. A method for handling traffic in a packet-switched integrated services network which supports a plurality of different service classes, the method comprising:
(a) receiving a packet at an arrival time (T), said packet being associated with one of a plurality of different priority classes of service, said one priority class ($P_P$) having a numeric value associated therewith;
(b) assigning a respective priority index value to said received packet, wherein said priority index value is determined by calculating a difference between a product of said $P_P$ value and said T value; and
(c) enqueuing said received packet within a sorted data structure in an order based upon its priority index value.

19. The method of claim 18 further including servicing queued packets within said data structure in an order based upon the respective priority index value of each queued packet.

20. The method of claim 18 wherein said priority index value ($P_{index}$) is calculated according to: $P_{index} = T - (P_P * \text{PRIORITY\_WEIGHT})$, wherein said PRIORITY_WEIGHT value is a predetermined constant.

21. The method of claim 18 further including determining said $P_P$ value by referencing a Type of Service (ToS) field in said packet.

22. A computer program product for handling traffic in a packet-switched integrated services network which supports a plurality of different service classes, the computer program product comprising:
at least one computer usable medium having computer readable code embodied therein, the computer readable code comprising:
computer code for determining an arrival time (T) and a service class priority value ($P_P$) associated with a received packet;
computer code for assigning a respective priority index value ($P_{index}$) to said received packet, wherein said priority index value is calculated by subtracting a product of said $P_P$ value from said T value; and
computer code for enqueuing said received packet within a sorted data structure in an order based upon said $P_{index}$ value.

23. The computer program product of claim 22 further including computer code for servicing queued packets within said data structure in an order based upon the respective priority index value of each queued packet.

24. The computer program product of claim 22 further including computer code for calculating said priority index value ($P_{index}$) according to:
$P_{index} = T - (P_P * \text{PRIORITY\_WEIGHT})$, wherein said PRIORITY_WEIGHT value is a predetermined constant.

25. The computer program product of claim 22 further including computer code for determining said $P_P$ value by referencing a Type of Service (ToS) field in said packet.

26. The computer program product of claim 22 further including:
computer code for determining an arrival time (T2) and a service class priority value ($P2_P$) associated with a second received packet, wherein said $P2_P$ value is different than said $P_P$ value;
computer code for assigning a second priority index value ($P2_{index}$) to said second received packet, wherein said second priority index value is calculated by subtracting a product of said $P2_P$ value from said T2 value; and
computer code for enqueuing said second received packet within said sorted data structure in an order based upon said $P2_{index}$ value.

27. A router for handling traffic in a packet-switched integrated services network which supports a plurality of different service classes, the router comprising:
means for determining an arrival time (T) and a service class priority value ($P_P$) associated with a received packet;
means for assigning a respective priority index value ($P_{index}$) to said received packet, wherein said priority index value is determined by calculating a difference between a product of said $P_P$ value and said T value; and
means for enqueuing said received packet within a sorted data structure in an order based upon said $P_{index}$ value.

28. The router of claim 27 further including means for servicing queued packets within said data structure in an order based upon the respective priority index value of each queued packet.

29. The router of claim 27 further including means for calculating said priority index value ($P_{index}$) according to:
$P_{index} = T - (P_P * \text{PRIORITY\_WEIGHT})$, wherein said PRIORITY_WEIGHT value is a predetermined constant.

30. The router of claim 27 further including means for determining said $P_P$ value by referencing a Type of Service (ToS) field in said packet.

31. The router of claim 27 further including:
means for determining an arrival time (T2) and a service class priority value ($P2_P$) associated with a second received packet, wherein said $P2_P$ value is different than said $P_P$ value;
means for assigning a second priority index value ($P2_{index}$) to said second received packet, wherein said second priority index value is calculated by subtracting a product of said $P2_P$ value from said T2 value; and
means for enqueuing said second received packet within said sorted data structure in an order based upon said $P2_{index}$ value.

32. The router of claim 31 wherein said $P_P$ priority class and said $P2_P$ priority class correspond to different levels of priority within a tiered best-effort service class.

33. A Cable Modem Termination System (CTMS) in a cable modem network for handling traffic in a packet-switched, integrated services network which supports a plurality of different service classes, the system comprising:

means for determining an arrival time (T) and a service class priority value ($P_{CM}$) associated with a received bandwidth request;

means for assigning a respective priority index value ($P_{index}$) to said received bandwidth request, wherein said priority index value is determined by calculating a difference between a product of said $P_{CM}$ value and said T value; and means for enqueuing said received bandwidth request within a sorted data structure in an order based upon said $P_{index}$ value.

34. The system of claim 33 further including means for servicing queued bandwidth requests within said data structure in an order based upon the respective priority index value of each queued bandwidth request.

35. The system of claim 33 further including means for calculating said priority index value ($P_{index}$) according to:

$P_{index}$=T−($P_{CM}$*PRIORITY_WEIGHT), wherein said PRIORITY_WEIGHT value is a predetermined constant.

36. The system of claim 33 further including means for determining said $P_{CM}$ value by identifying a service ID of a cable modem which issued said bandwidth request.

37. The system of claim 33 further including:

means for determining an arrival time (T2) and a service class priority value ($P2_{CM}$) associated with a second received bandwidth request, wherein said $P2_{CM}$ value is different than said $P_{CM}$ value;

means for assigning a second priority index value ($P2_{index}$) to said second received bandwidth request, wherein said second priority index value is calculated by subtracting a product of said $P2_{CM}$ value from said T2 value; and means for enqueuing said second received bandwidth request within said sorted data structure in an order based upon said $P2_{index}$ value.

38. The system of claim 37 wherein said $P_{CM}$ priority class and said $P2_{CM}$ priority class correspond to different levels of priority within a tiered best-effort service class.

* * * * *